(12) United States Patent
Kolahi et al.

(10) Patent No.: US 8,671,777 B2
(45) Date of Patent: Mar. 18, 2014

(54) CORIOLIS MASS FLOWMETER WITH THERMALLY, ELECTRICALLY, AND MAGNETICALLY ISOLATED ELECTRONICS

(75) Inventors: Kourosh Kolahi, Duisburg (DE); Andreas Poremba, Wuppertal (DE)

(73) Assignee: KROHNE Messtechnik GmbH, Duisburg (DE)

( * ) Notice: Subject to any disclaimer, the term of this patent is extended or adjusted under 35 U.S.C. 154(b) by 417 days.

(21) Appl. No.: 13/071,007

(22) Filed: Mar. 24, 2011

(65) Prior Publication Data

US 2011/0259121 A1    Oct. 27, 2011

(30) Foreign Application Priority Data

Apr. 23, 2010  (DE) .......................... 10 2010 018 223

(51) Int. Cl.
*G01F 1/84*  (2006.01)
(52) U.S. Cl.
USPC .................................................... 73/861.355
(58) Field of Classification Search
USPC ..................................... 73/861.354, 861.355
See application file for complete search history.

(56) References Cited

U.S. PATENT DOCUMENTS

| | | | | |
|---|---|---|---|---|
| 4,738,143 | A * | 4/1988 | Cage et al. ............... | 73/861.355 |
| 5,048,350 | A | 9/1991 | Hussain et al. | |
| 6,606,917 | B2 | 8/2003 | Sund et al. | |
| 6,662,120 | B2 * | 12/2003 | Drahm et al. .................. | 702/43 |
| 6,748,813 | B1 | 6/2004 | Barger et al. | |
| 7,127,952 | B2 * | 10/2006 | Bitto et al. ............... | 73/861.355 |
| 7,345,581 | B2 | 3/2008 | Matt | |
| 7,472,592 | B2 | 1/2009 | Ban | |
| 7,543,509 | B2 | 6/2009 | Davies | |
| 7,546,777 | B2 | 6/2009 | Bitto et al. | |
| 7,555,962 | B2 | 7/2009 | Bitto et al. | |
| 7,631,561 | B2 | 12/2009 | Bitto et al. | |
| 7,640,799 | B2 | 1/2010 | Griessbaum et al. | |
| 2001/0037690 | A1 * | 11/2001 | Bitto et al. ............... | 73/861.355 |
| 2003/0010136 | A1 * | 1/2003 | Drahm et al. ............ | 73/861.355 |
| 2003/0097884 | A1 * | 5/2003 | Sund et al. ............... | 73/861.355 |
| 2006/0016273 | A1 * | 1/2006 | Bitto et al. ............... | 73/861.355 |
| 2006/0107758 | A1 * | 5/2006 | Rieder et al. ............. | 73/861.355 |
| 2007/0095152 | A1 * | 5/2007 | Bitto et al. ............... | 73/861.355 |

(Continued)

FOREIGN PATENT DOCUMENTS

| | | |
|---|---|---|
| DE | 10 2004 023 999 A1 | 12/2005 |
| DE | 20 2006 003 348 U1 | 7/2006 |
| DE | 10 2008 007 742 A1 | 11/2008 |
| JP | 7-83720 A | 3/1995 |

*Primary Examiner* — Harshad R Patel
(74) *Attorney, Agent, or Firm* — Roberts Mlotkowski Safran & Cole, P.C.; David S. Safran

(57) ABSTRACT

A Coriolis mass flowmeter (1) having at least one sensor arrangement (2), at least one transducer (3) and at least one housing (4), wherein the sensor arrangement (2) has at least one measuring tube (5) that can be excited to oscillation, at least one oscillation generator (6) and at least one oscillation sensor (7), wherein the transducer (3) at least in part has evaluation and power electronics for controlling and measurement evaluation of the sensor arrangement, wherein the sensor arrangement (2) and the transducer (3) are arranged adjacent to one another in a common volume defined by the housing (4). A Coriolis mass flowmeter of the described type, in which the physical interaction between the sensor arrangement and transducer is reduced, is realized by the provision of a thermal barrier (8) arranged at least in a space between the sensor arrangement (2) and the transducer (3).

4 Claims, 3 Drawing Sheets

(56) References Cited

U.S. PATENT DOCUMENTS

| | | |
|---|---|---|
| 2008/0211278 A1* | 9/2008 | Macliver .................... 297/250.1 |
| 2008/0258735 A1* | 10/2008 | Quackenbush et al. ....... 324/445 |
| 2009/0235759 A1 | 9/2009 | Bitto et al. |
| 2009/0260873 A1* | 10/2009 | Konoma ...................... 174/548 |
| 2010/0206090 A1* | 8/2010 | Stack ........................ 73/861.357 |
| 2011/0259123 A1* | 10/2011 | Bitto et al. ............... 73/861.357 |

* cited by examiner

CORIOLIS MASS FLOWMETER WITH THERMALLY, ELECTRICALLY, AND MAGNETICALLY ISOLATED ELECTRONICS

BACKGROUND OF THE INVENTION

1. Field of the Invention

The invention relates to a Coriolis mass flowmeter having at least one sensor arrangement, at least one transducer and at least one housing, wherein the sensor arrangement has at least one measuring tube that can be excited to oscillation, at least one oscillation generator and at least one oscillation sensor, wherein the transducer at least in part has the evaluation and power electronics for controlling and measurement evaluation of the sensor arrangement, wherein the sensor arrangement and the transducer are arranged adjacent to one another in a common volume defined by the housing.

2. Description of Related Art

Coriolis mass flowmeters of the type mentioned above are known, for example, from German Patent Application DE 10 2008 007 742 A1. In Coriolis mass flowmeters in general, a measuring tube with a flowing medium is excited into oscillation by an oscillation generator, preferably in a certain eigenform in the resonance frequency. On the input and output sides, inertial forces act differently on the medium flowing in the measuring tube to be excited and, thus, on the measuring tube, so that the deflection of the measuring tube is influenced differently on the input and output sides, and, in this manner, the input and output side oscillations of the measuring tube detected mostly by oscillation sensors arranged at different positions have a phase shift, which is a direct variable for the mass flow of interest and the actual, derived variable to be determined by the evaluation electronics. The transducer, here, also includes the power electronics required for controlling the oscillation generator, wherein the oscillation generator usually consists of electromagnetic actuators, which periodically excite the measuring tubes with flow in resonance frequencies. This operating mode is common in practically all Coriolis mass flowmeters, regardless of whether the sensor arrangement and the transducer are adjacent to one another in a common housing and are arranged in a common volume defined by the housing or whether the sensor arrangement and the transducer—as is normal in most Coriolis mass flowmeters—are arranged in different volumes of different housings.

The more common design of Coriolis mass flowmeters, in which the sensor arrangement and the transducer are implemented separate from one another in different housing volumes, has different advantages that deal with the spatial separation of transducer and sensor arrangement, such as the separate compatibility of the mechanical construction—sensor arrangement—and the measuring device electronics—transducer—and the thermal de-coupling resulting from the spatial separation, in particular from the measuring tubes and the transducer. It should be taken into account, here, that in certain applications in which the Coriolis mass flowmeter is used, there are high medium temperatures and/or high temperature fluctuations, either because the process basically requires such temperatures or because such temperature relations have to be temporarily created, for example, for disinfecting or sterilizing sections of the process, and thus, also of the Coriolis mass flowmeter. Due to the spatial separation of the sensor arrangement and transducer, an electric and magnetic de-coupling between the transducer and the parts of the sensor arrangement relevant to electronics and magnetism, i.e., the oscillation generators, occurs independently of the thermal de-coupling.

Generic Coriolis mass flowmeters are more compact in design and can be designed to be tough due to the closed construction. In these types of Coriolis mass flowmeters, in which the sensor arrangement and the transducer are adjacent to one another in a common volume defined by the housing, as opposed to the above-mentioned construction, the sensor arrangement and the transducer strongly interact due to their relative closeness to one another, which can be a problem, in particular in view of compliance of certain measurement accuracies that are placed, in particular, on Coriolis mass flowmeters of high requirements; in this manner, an accuracy of less than 0.04% from the measurement of the mass flow is often required for Coriolis mass flowmeters.

SUMMARY OF THE INVENTION

The inventor spotted the object of the present invention, namely to provide a Coriolis mass flowmeter of the type described above, i.e. a Coriolis mass flowmeter in which the sensor arrangement and the transducer are arranged adjacent to each other in a common volume defined by the housing, in which the physical interaction between sensor arrangement and transducer is reduced to a beneficial amount.

According to a first teaching of the invention, the above described and derived object is surprisingly met in that a thermal barrier is arranged at least in the space between the sensor arrangement and the transducer, wherein this thermal barrier serves to inhibit the thermal transport between the sensor arrangement and the transducer, in particular for worsening the thermal transfer between the measuring tube of the sensor arrangement and the transducer. When it is said that the thermal barrier is provided at least in the space between the sensor arrangement and the transducer, then the space that is crossed by the shortest possible link between the sensor arrangement and the transducer is meant. When the transducer—as is common—is implemented on or with a printed circuit board, then, consequently, the space between the measuring tube of the sensor arrangement and the printed circuit board of the transducer is meant by the space between the sensor arrangement and the transducer, in particular, the part of space of the volume defined by the housing that is crossed by the shortest possible link between the measuring tube and the transducer implemented as printed circuit board. The arrangement of a thermal barrier according to the invention in this area reduces the thermal transfer between the transducer and the sensor arrangement, so that the thermal interaction is reduced.

It has been surprisingly shown to be of advantage when the thermal barrier is linked to the housing in such a manner that the volume of the housing is split into a first partial volume including the sensor arrangement and a second partial volume including the transducer. Here, it is not of particular importance that the first partial volume and the second partial volume are not linked to one another; however, it is important that the volumes, especially in the space between the sensor arrangement and the transducer, are implemented as separate volumes that differ from one another.

According to a further independent teaching of the invention, the above derived object is unexpectedly further met in that, at least in the space between the transducer and the housing, a thermal bridge for transferring heat from the transducer to the housing is arranged. This makes temperature compensation between the transducer and the housing possible, wherein temperature compensation between the housing and the surroundings are dependent on the surrounding conditions or on measures that are implemented outside of the housing, which, however, is not the object of consideration here.

When it is said, presently, that the thermal bridge is implemented at least in the space between the transducer and the housing, then, in turn, the area of the volume defined by the housing—i.e., the inner space—is meant, which is crossed by essentially the shortest, direct link—i.e., then sensor arrangement is not in the way—between the transducer and the housing.

According to a particularly preferred design of the invention, it is provided that the thermal bridge is at least partially implemented by at thermally conductive potting of the transducer, wherein "at least partially" means that the thermal bridge can also include other components, which take part in thermal conductivity. The advantage of a thermally conductive potting is that the often differing, large electric components of the transducer directly give off their heat to the potting, without the danger that the released heat is emitted or given off by convection or radiation in the entire inner space of the housing; the thermal potting "binds" the released heat, so to speak, spatially, and further, guides it in a controlled manner by means of its geometric shape.

According to a further advantageous design of the invention, it is provided that the thermal bridge is at least partially implemented by a rigid reinforcement element, or acts as a rigid reinforcement element, wherein this reinforcement element is implemented preferably in surface contact with the housing. The reinforcement element can, for example, be realized by two stainless steel plates that are rigidly connected with the shield, pushed into the housing and mounted with the housing under mechanical stress and affixed to the housing; the attachment preferably occurs by means of spot welding (point welding). The use of such a construction ensures that a mechanically safe link is produced between the transducer and the housing, namely the resilience of the walls of the housing is prevented. It has been shown to be of particular advantage when the above measures of the implementation of a thermally conductive potting and the implementation of a non-flexible link between the transducer and the housing, which is arranged, for example, as a stainless steel plate between the thermal potting around the transducer and a wall of the housing, are provided, since a combination of the described advantages is possible in a simple manner.

According to a further teaching—implemented independently from the above-described measures, the above-described object is also met unexpectedly by an electric and/or magnetic shield being arranged around the transducer, at least in the space between the transducer and the sensor arrangement; this formulation is based on exactly the same understanding of the "to be arranged in the space" as has already been described above. It has been shown to be of particular advantage when the electric and/or magnetic shield also extends into in the space between the transducer and the housing, since a safe and comprehensive shield can be guaranteed in this manner. In particular, in connection with the above-mentioned shield, it is provided by a preferred design of the invention that the electric and/or magnetic shield is made of a thermally, highly conductive material, in particular of a magnetically soft substance with a high magnetic permeability. For this reason, the electric and/or magnetic shield, at the same time, also becomes a thermal bridge between the transducer and the housing in the area between the transducer and the housing.

The described measures can all be implemented particularly advantageously in such Coriolis mass flowmeters, in which the measuring tube of the sensor arrangement is bent, in particular is U- or V-shaped and in which the transducer is arranged between the U- or V-legs of the measuring tube or measuring tubes; it is directly evident here that the transducer and the sensor arrangement are arranged adjacent to one another, in particular when the housing closely surrounds the sensor arrangement, which provides the structural outer dimensions of the Coriolis mass flowmeter, in order to achieve a compact configuration.

As has already been described, all measures according to the described teaching of the invention can be implemented independent of one another, i.e., the thermal barrier, independent of the thermal bridge and the electric and/or magnetic shield, and the electric and/or magnetic shield independent of the thermal barrier and the thermal bridge. Nevertheless, it is of particular advantage when at least two of the three different measures—thermal barrier, thermal bridge, electric and/or magnetic shield—are implemented in a Coriolis mass flowmeter according to the invention, since thereby a physical de-coupling or desired coupling—thermal bridge—can be achieved in a comprehensive manner.

A particularly preferred design is that the electric and/or magnetic shield is arranged between an inner section of the thermal bridge and an outer section of the thermal bridge, in particular wherein the inner section of the thermal bridge is implemented as potting directly surrounding the transducer, in particular wherein the outer section of the thermal bridge is implemented as at least one reinforcement element between the electric and/or magnetic shield and the housing. It has been shown to be of particular advantage when the above-mentioned measures are used to reinforce the housing of the Coriolis mass flowmeter, when the thermal barrier and/or the thermal bridge and/or the electric and/or magnetic shield is/are linked with the housing, and in this way, a mechanical reinforcement is achieved. Hereby, particular attention is paid to the link with the housing in that the resonance frequencies of the housing are shifted outside of the operating frequency so that a mechanical decoupling from the sensor arrangement can be implemented using the reinforcement. Thereby, the resonance frequency of the housing influenced by the link is designed in such a manner that it is at least a decade greater than the operating frequency of the Coriolis mass flowmeter. According to an advantageous further development of the invention, a particularly effective reinforcement can be achieved in that the thermal barrier and/or the thermal bridge and/or the electric and/or magnetic shield links or link at least two opposing sides of the housing. These measures lead to a substantial shortening of the freely swinging sections of the housing, whereby the resonance frequency of the housing can, surprisingly, be increased.

In detail, there are a number of possibilities for designing and further developing the Coriolis mass flowmeter according to the invention as will be apparent from the following description of embodiments in connection with the accompanying drawings.

DETAILED DESCRIPTION OF THE INVENTION

Figure 1:
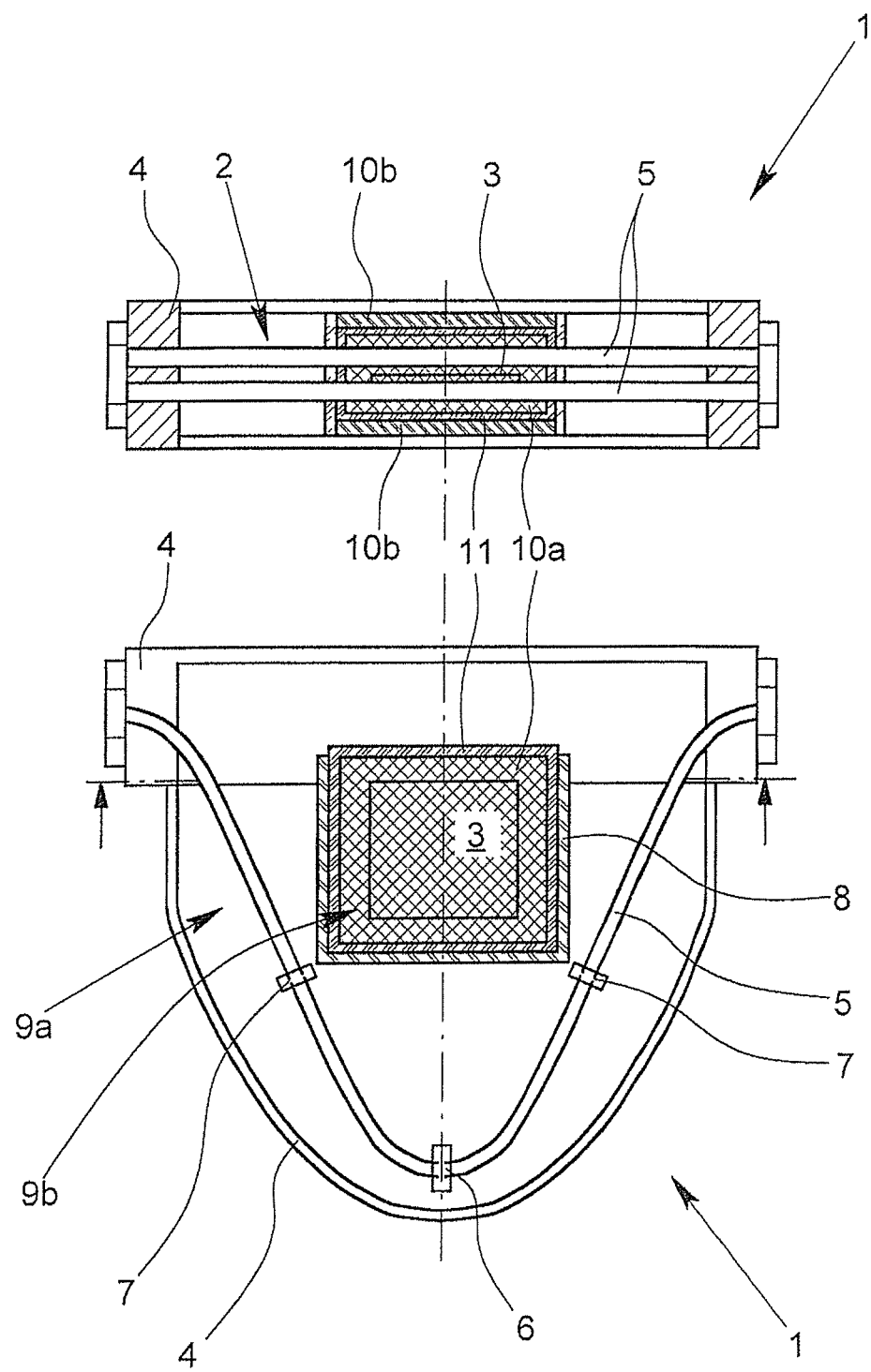
FIG. 1 are partial sectional schematic representations of the Coriolis mass flowmeter according to the invention in top and side views, respectively.
Figure 2:
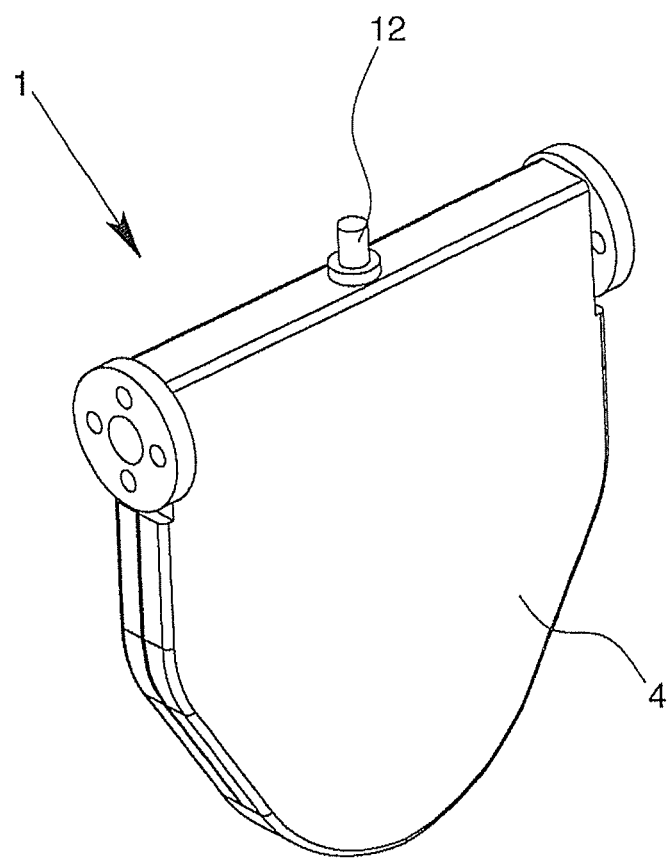
FIG. 2 is a perspective view of the housing of the Coriolis mass flowmeter and FIG. 3 is a sectional view of the electromechanical plug connection of the Coriolis mass flowmeter according to FIG. 2.

A Coriolis mass flowmeter 1 is represented in each of FIGS. 1 & 2. FIG. 1 shows the Coriolis mass flowmeter schematically from above (top) and from a side (below), as a section or a partial section. The illustrated Coriolis mass flowmeter 1 includes three main components, namely the sensor arrangement 2, a transducer 3 and a housing 4. The sensor arrangement 2 includes two measuring tubes 5 that can be excited to oscillation, an oscillation generator 6 and two oscillation sensors 7. The transducer 3 includes the evaluation and power electronics for controlling and measurement evaluation of the sensor arrangement, wherein the evaluation and power electronics are not shown in detail here beyond the extent of the printed circuit board on which transducer 3.

The measuring tubes 5 of the illustrated Coriolis mass flowmeter 1 are designed in a V-shape, wherein the transducer 3 is arranged between the legs of the V-shape of the measuring tube 5, which is why the sensor arrangement 2 and the transducer 3 are arranged adjacent to one another. The housing 4 forms an outer casing of the Coriolis mass flowmeter 1 and defines, thus, the volume in which the components arranged adjacent to one another, i.e., sensor arrangement 2 and transducer 3, are located, which can be seen in FIG. 2.

The relative closeness between sensor arrangement 2 and transducer 3 involves the risk that the sensor arrangement 2 and the transducer 3 physically influence one another in an undesired manner. Such an influence is initially prevented in the Coriolis mass flowmeter shown in FIG. 1, also in respect to the inner construction, in that a thermal barrier 3 is arranged in the space between the sensor arrangement 2 and the transducer, which reduces, in particular, the thermal transfer between the measuring tubes 5 and the transducer 3. In the bottom representation in FIG. 1, it can easily be seen that the thermal barrier 8 represents a barrier between the sensor arrangement 2 and the transducer 3 at least everywhere where a direct, shortest, link is present between the sensor arrangement 2 and the transducer 3. The thermal barrier 8 can also be extended further, it is, however, of particular importance that, in this sense, it is provided in the space between the sensor arrangement 2 and the transducer 3.

The thermal barrier 8 is—as can be seen in FIG. 1—is linked with the housing 4 in such a manner that the volume of the housing 4 is split into a first partial volume 9a including the sensor arrangement 2 and a second partial volume 9b including the transducer; here, it is not of particular importance that the first partial volume 9a and the second partial volume 9b represent separate partial volumes of the entire volume defined by the housing 4, this is only important in the space defined above, between the sensor arrangement 2 and the transducer 3.

A de-coupling between the sensor arrangement 2 and the transducer 3 is, however, not only achieved with the thermal barrier 8 described above, but also with a thermal bridge 10, which is arranged in the space between the transducer 3 and the housing 4 and aids in transferring heat from the transducer 3 to the housing 4. In this manner, on the one hand, thermal influencing of the transducer 3, in particular, by the measuring tubes 5 of the sensor arrangement 2, is prevented by means of the thermal barrier 8; on the other hand, however, it is possible to use the thermal bridge 10 for transferring heat.

It can, in particular, be easily seen in the upper representation in FIG. 1 that the thermal bridge 10 is implemented, on the one hand, by a thermally conductive potting 10a of the transducer 3. On the other hand, the thermal bridge 10 is also implemented by a reinforcement element 10b, which is only schematically shown in FIG. 1. It is important that, all in all, surface contact is made with the housing 4 by the reinforcement element 10b. Surface contact with the housing 4 is advantageous for as good as possible thermal transfer to the housing wall and also provides a mechanically stabilizing function.

In the Coriolis mass flowmeter 1 shown in FIG. 1, however, not only is a thermal de-coupling implemented, but also an electric and magnetic shield 11, which is arranged around the transducer 3 in the space between the transducer 3 and the sensor arrangement 2. The electric and magnetic shield 11 surrounds the transducer 3 almost completely in the illustrated Coriolis mass flowmeter 1, and thus, is also arranged in the space between the transducer 3 and the housing 4, as can be seen from the upper representation in FIG. 1. Since the electric and magnetic shield 11 is also in the way in this case, where the amount of heat is transferred to the housing 4, i.e., in the space between the transducer 3 and the housing 4, the electric and magnetic shield 11 is presently made of a good thermally conductive material, namely, of a magnetically soft substance with a high permeability. This feature of the electric and magnetic shield 11 assures, in particular, that the influence of the evaluation and power electronics, which create alternating magnetic and electromagnetic fields, which asymmetrically couple to the oscillation sensors 7 and cover the phase shift of the sensor signals caused by mass flow, is small or eliminated. Conversely, the influence of the oscillation generator 6 and the oscillations sensors 7, which are surrounded by alternating magnetic, respectively, electromagnetic fields, on the transducer 3 is marginal respectively prevented.

The Coriolis mass flowmeter 1 according to FIGS. 1 & 2 implements, all in all, different measures, namely a thermal barrier 8, a thermal bridge 10 and an electric and magnetic shield 11, wherein the thermal bridge also functions here like a rigid reinforcement element, which mechanically reinforces the housing 4 by an inner rigid link of the housing walls. Other Coriolis mass flowmeters, not shown here, make do with implementing, for example, only one thermal barrier and additionally a thermal bridge or an electric and/or magnetic shield, i.e., do without one or even two of the presently implemented measures.

In the present case, the thermal barrier 8 as well as the thermal bridge 10—here the section of the thermal bridge 10 that is designed as a reinforcement element 10b—is linked with two opposing sides of the housing 4, so that the housing 4 is mechanically reinforced by the link, which is beneficial for the stability of the mechanical casing in the form of the housing 4, which, however, surprisingly also leads to the resonance frequencies of the housing 4 being shifted out of the operating frequency area of the Coriolis mass flowmeter 1, in particular up to higher frequencies. It has been taken into consideration, here, that the resonance frequencies of the housing 4 are increased by the link with the thermal barrier 8 and the thermal bridge 10 in such a manner that the operating frequency of the Coriolis mass flowmeter 1, which is also variable due to a tracking control, i.e., the frequency at which the measuring tubes 5 are excited to oscillation by the oscillation generator 6, cannot have an interfering influence. In the shown Coriolis mass flowmeter 1, this works out particularly well, since the thermal barrier 8 and the thermal bridge 10 together with the magnetic shield 11 link two opposing flat sides of the housing 4.

Figure 3:
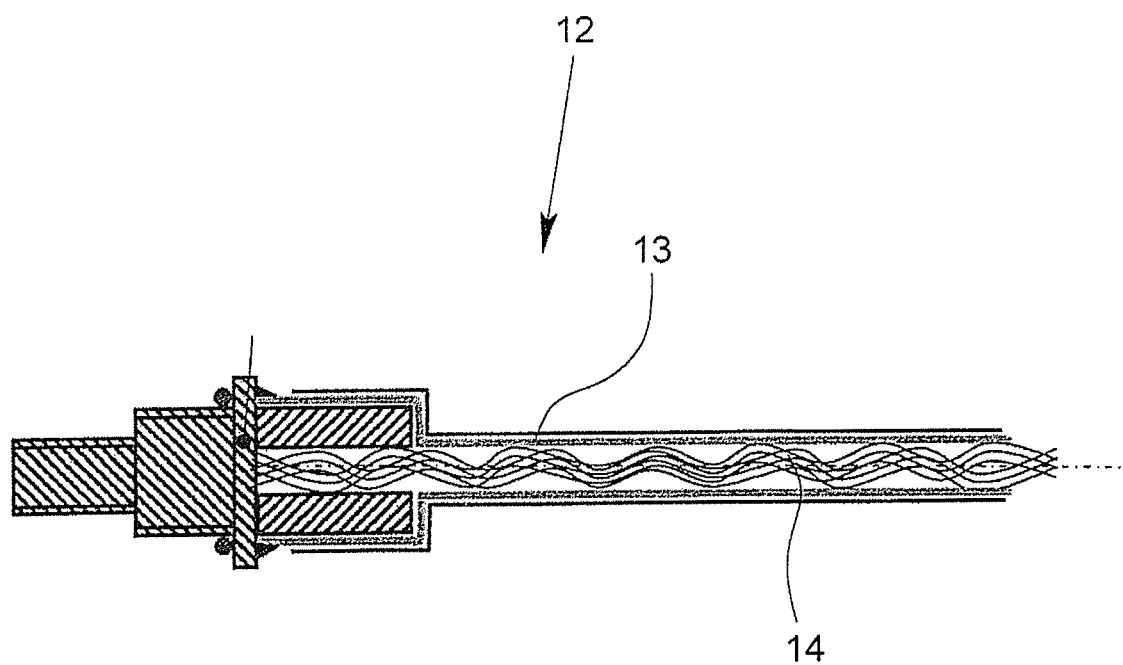

The electric connection between the oscillation generator 6 and the oscillation sensors 7 to the transducer 3 is not shown in FIG. 1, which, of course, need to be present for proper functioning. In FIG. 2, a plug 12 is shown on the upper flat side of the housing 4, which is shown again in detail in a schematic sectional representation in FIG. 3. Multiple twisted cable pairs 14 are lead over a shield 13 into this plug 12, using which, for example, measurement signals can be conveyed to the outside or a data communication can be implemented from the outside with the transducer, for example for diagnostic purposes or providing data to a subordinate process control.

What is claimed is:

1. Coriolis mass flowmeter, comprising:
   at least one sensor arrangement,
   at least one transducer and
   at least one housing defining at least a common volume in which the at least one sensor arrangement and the at least one transducer are located,
   wherein the at least one sensor arrangement has at least one measuring tube that can be excited to oscillation, at least one oscillation generator and at least one oscillation sensor,
   wherein the at least one transducer has at least part of the evaluation and power electronics for controlling and measurement evaluation of the sensor arrangement,
   wherein a thermal barrier is arranged at least in the space between the at least one sensor arrangement and the at least one transducer,
   wherein a thermal bridge for transferring heat from the transducer to the housing is arranged at least in the space between the transducer and the housing,
   wherein at least one of an electric shield and a magnetic shield is arranged around the transducer at least in the space between the transducer and the sensor arrangement, and
   wherein the at least one of an electric shield and a magnetic shield is arranged between an inner section of the thermal bridge and an outer section of the thermal bridge.

2. Coriolis mass flowmeter according to claim 1, wherein the thermal barrier is linked to the housing in such a manner that the volume of the housing is split into a first partial volume including the sensor arrangement and a second partial volume including the transducer.

3. Coriolis mass flowmeter according to claim 1, wherein an inner part of the thermal bridge comprises a potting directly surrounding the transducer, and wherein an outer part of the thermal bridge comprises at least one reinforcement element between the housing and the at least one of an electric shield and a magnetic shield.

4. Coriolis mass flowmeter according to claim 1, wherein the measuring tube of the sensor arrangement is U-shaped or V-shaped and the transducer is arranged between the U- or V-legs.

* * * * *